United States Patent
Novoselov et al.

(10) Patent No.: US 10,490,141 B1
(45) Date of Patent: Nov. 26, 2019

(54) RESET PULSE CONTROL TO MANAGE FLICKER OF AN ELECTROWETTING DISPLAY DEVICE

(71) Applicant: Amazon Technologies, Inc., Seattle, WA (US)

(72) Inventors: Pavel Novoselov, Eindhoven (NL); Jozef Elisabeth Aubert, Roermond (NL); Petrus Maria de Greef, Waalre (NL)

(73) Assignee: Amazon Technologies, Inc., Seattle, WA (US)

(*) Notice: Subject to any disclaimer, the term of this patent is extended or adjusted under 35 U.S.C. 154(b) by 1002 days.

(21) Appl. No.: 14/868,167

(22) Filed: Sep. 28, 2015

(51) Int. Cl.
  *G09G 3/34* (2006.01)
  *G02B 26/00* (2006.01)

(52) U.S. Cl.
  CPC .......... *G09G 3/348* (2013.01); *G02B 26/005* (2013.01); *G09G 2310/08* (2013.01); *G09G 2360/142* (2013.01)

(58) Field of Classification Search
  None
  See application file for complete search history.

(56) References Cited

U.S. PATENT DOCUMENTS

| | | | |
|---|---|---|---|
| 7,952,557 B2 | 5/2011 | Amundson et al. | |
| 9,001,027 B2 | 4/2015 | Choi et al. | |
| 9,530,363 B2 | 12/2016 | Ben-Dov et al. | |
| 10,043,456 B1* | 8/2018 | de Greef | G09G 3/3406 |
| 2006/0119567 A1 | 6/2006 | Zhou et al. | |
| 2007/0035510 A1 | 2/2007 | Zhou et al. | |
| 2007/0075941 A1* | 4/2007 | Zhou | G02B 26/005 345/84 |
| 2007/0103427 A1 | 5/2007 | Zhou et al. | |
| 2007/0176889 A1 | 8/2007 | Zhou et al. | |
| 2008/0001909 A1* | 1/2008 | Lim | G09G 3/3406 345/102 |
| 2010/0149145 A1* | 6/2010 | Van Woudenberg | G09G 3/34 345/207 |
| 2010/0225611 A1* | 9/2010 | Lee | G02B 26/005 345/174 |
| 2010/0231566 A1 | 9/2010 | Feenstra et al. | |

(Continued)

FOREIGN PATENT DOCUMENTS

WO  WO2008119774  10/2008

OTHER PUBLICATIONS

The PCT Search Report and Written Opinion dated Sep. 7, 2016 for PCT application No. PCT/US2016/039311, 10 pages.

(Continued)

*Primary Examiner* — Parul H Gupta
(74) *Attorney, Agent, or Firm* — EIP US LLP

(57) ABSTRACT

An electrowetting display device may comprise pixel regions arranged on a support plate, wherein each of the pixel regions includes a thin film transistor (TFT); a sensor disposed on the support plate, wherein the sensor is configured to generate a voltage based, at least in part, on light impinging on at least a portion of the pixel regions; and a reset control circuit configured to: based, at least in part, on the voltage generated by the sensor, determine an amount of modulation of the light; generate a reset pulse based, at least in part, on the determined amount of modulation of the light; and apply the reset pulse to each of the TFTs of at least some of the pixel regions.

20 Claims, 7 Drawing Sheets

(56) References Cited

U.S. PATENT DOCUMENTS

| | | | |
|---|---|---|---|
| 2011/0007046 A1* | 1/2011 | Tsai | G02B 26/005 345/207 |
| 2011/0025668 A1 | 2/2011 | Huitema et al. | |
| 2012/0154886 A1 | 6/2012 | Heikenfeld et al. | |
| 2013/0106821 A1 | 5/2013 | Aubert et al. | |
| 2013/0113842 A1 | 5/2013 | Hwang et al. | |
| 2013/0127817 A1* | 5/2013 | Hwang | G09G 3/001 345/212 |
| 2013/0257914 A1* | 10/2013 | Jung | G09G 3/348 345/690 |
| 2013/0342890 A1* | 12/2013 | Shim | G09G 3/348 359/290 |
| 2014/0022622 A1* | 1/2014 | Park | G02B 26/005 359/290 |
| 2014/0063039 A1* | 3/2014 | Drzaic | G09G 5/02 345/589 |
| 2014/0078035 A1 | 3/2014 | Sato et al. | |
| 2014/0139507 A1 | 5/2014 | Jung et al. | |
| 2014/0139571 A1* | 5/2014 | Albrecht | G09G 5/02 345/694 |
| 2014/0300594 A1 | 10/2014 | Aubert et al. | |
| 2017/0003495 A1* | 1/2017 | De Greef | G02B 26/005 |
| 2017/0004779 A1 | 1/2017 | Novoselov et al. | |

OTHER PUBLICATIONS

Office action for U.S. Appl. No. 14/788,528, dated Nov. 9, 2016, Novoselov et al., "Reset Drive Voltage to Enhance Grey Scale Resolution for an Electrowetting Display Device", 14 pages.

Office action for U.S. Appl. No. 14/788,528, dated Mar. 7, 2017. Novoselov et al., "Reset Drive Voltage to Enhance Grey Scale Resolution for an Electrowetting Display Device", 18 pages.

Office action for U.S. Appl. No. 14/788,528, dated Jun. 23, 2017. Novoselov et al., "Reset Drive Voltage to Enhance Grey Scale Resolution for an Electrowetting Display Device", 19 pages.

\* cited by examiner

RESET PULSE CONTROL TO MANAGE FLICKER OF AN ELECTROWETTING DISPLAY DEVICE

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light transmission through each pixel is adjustable by electronically controlling a position of the liquid in the pixel. Resolution and quality of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
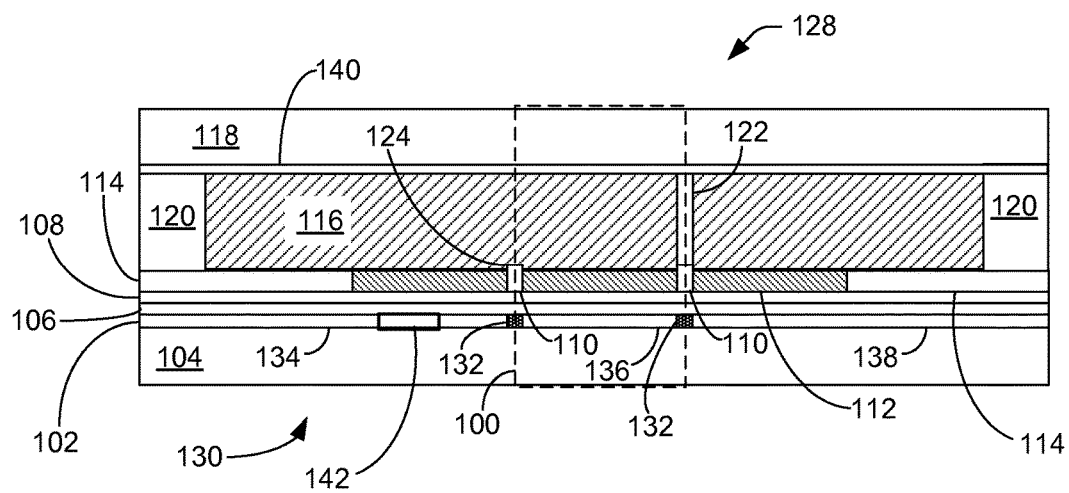
FIG. 1 illustrates a cross-section of a portion of an electrowetting display device, according to some embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for operating electronic devices including these components for the electrowetting displays and other features described herein.

In some embodiments, an electrowetting display device includes a first support plate and a second support plate and a plurality of pixel regions therebetween. Herein, unless otherwise indicated, a viewing side of an electrowetting display is not limited to the side of the display that includes either the first support plate or the second support plate. Individual pixel regions may include one or more hydrophobic layers or surfaces on the first support plate, a first fluid, and a second fluid at least partially surrounding the first fluid. For example, the first fluid may be an oil and the second fluid may be an electrolyte solution. A hydrophobic layer may comprise a hydrophobic amorphous fluoropolymer (AF), for example. Herein, the term "hydrophobic" is used to describe a material or layer that is hydrophobic relative to other materials or layers. For example, a hydrophobic layer need not be 100% hydrophobic, though the hydrophobicity of the layer may be relatively high. Hydrophobicity of a "hydrophobic material" or "hydrophobic layer" may change under various circumstances or conditions. While each pixel region may include a first electrode disposed on the first plate, a single top electrode on the second support plate may overlay a plurality of the pixel regions. Herein, "disposed on" includes the possibility of intermediate layers (e.g., "disposed on" need not mean "directly on").

Generally, reset pulses may be periodically applied to the electrowetting pixels to reduce adverse effects on the quality (e.g., brightness, contrast ratio, and so on) of an image displayed by the pixels resulting from electrowetting fluid backflow. For example, such backflow can reduce the stability of a display state during a display period which, for example, is the period during which a desired first display state is to be maintained. Here, the first display state corresponds to a first fluid (e.g., electrowetting oil) being contracted or partially contracted to allow light to transmit through (or reflect from) the electrowetting pixel. Even though a first signal level corresponding to the first display state is applied to the electrowetting element during this period, the contracted or partially contracted first fluid tends to flow back to form a layer over the bottom electrode layer of the pixel, as in the case of an inactive state that prevents light from transmitting through (or reflecting from) the electrowetting pixel. The rate of backflow depends, at least in part, on the properties of the first fluid. Backflow leads to an undesirable change in the display state of the electrowetting pixel and, consequently, a reduced quality of the image of the display device.

The application of a reset pulse during the display period of the first display state resets the electrowetting pixel to counteract backflow. Since a reset pulse may affect the instantaneous display state of an electrowetting pixel, the duration of the reset pulse is relatively short compared to the duration of the first signal level corresponding to the first display state. For example, the reset pulse may have a duration short enough so as to not be noticeable to a viewer of the display device. In some examples, such a duration may be about 10% of the duration of the first signal level corresponding to the first display state. For a particular example, the duration of a reset pulse may be in a range from about 0.5 to 2.0 milliseconds, though claimed subject matter is not so limited.

In various embodiments, an electrowetting display device may include a control circuit to apply a reset pulse to a plurality of pixel regions, hereinafter referred to as "pixels". The control circuit may adjust the amplitude of such a reset pulse to modify voltage driving characteristics of the pixels. Such adjusting may be based, at least in part, on an electronic signal (e.g., voltage level) generated by a photosensitive electronic device. For example, the photosensitive electronic device may produce a voltage corresponding to the intensity of light it receives. In various embodiments, such a photosensitive electronic device may be located in an electrowetting display device so that the intensity of light received by the photosensitive electronic device is the same as or similar to light throughput of the pixels (e.g., whether the pixels are reflective or transmissive). For example, the photosensitive electronic device may be placed in a "modified" pixel, where such a pixel is similar to other pixels in an array of pixels except that a reflective layer may not be present in the modified pixel. Accordingly, light that would otherwise reflect from a reflecting layer of a pixel instead may impinge onto the photosensitive electronic device, which may be at or near the lower portion of the modified pixel, as described in detail below.

As explained below, a number of inherent electronic properties of the pixels adversely affect reset pulses applied to the pixels. For example, such adverse effects may cause a drop in voltage of applied reset pulses. As a result, the pixels may not be "optimally" operated and light throughput in the pixels may be less than desired. By adjusting the amplitude of reset pulses based on light throughput of the pixels, the control circuit may compensate for such adverse effects. Such adjusting may be performed in real time (e.g., dynamically, such as during active display by the pixels), for example.

In some embodiments, an electrowetting display device may include a control circuit to generate a reset pulse having a particular shape and provide the reset pulse to a plurality of pixels. The control circuit may adjust the shape of the reset pulse to modify an amount of flicker produced by the pixels. Flicker refers to a modulation of intensity of the light throughput of a pixel(s). The modulation is due to, among other things, a cycle of fluid backflow and reset pulses applied to the pixel(s). An observer of an electrowetting display device may notice (e.g., perceive) relatively large amounts of flicker. In such a case, the observer may find the flicker to be distractive and annoying. Thus, the amount of flicker should be relatively low, which may be achieved by adjusting the shape of the reset pulses applied to the pixel(s). The shape of the reset pulse may be described by width, frequency, and amplitude of the reset pulse. Modifying one or more of such parameters of the reset pulse may affect voltage driving characteristics of the pixels, and thus affect the amount of flicker. Such modifying may be based, at least in part, on an electronic signal (e.g., voltage level) generated by a photosensitive electronic device. For example, the photosensitive electronic device may produce a voltage corresponding to intensity of light it receives, which may be representative of the amount of flicker produced by the pixels. In various embodiments, similar to that described above, such a photosensitive electronic device may be located in an electrowetting display device so that the intensity of light received by the photosensitive electronic device is the same as or similar to light throughput of the pixels (e.g., whether the pixels are reflective or transmissive). For example, the photosensitive electronic device may be placed in a modified pixel that is similar to other pixels in an array of pixels except that a reflective layer may not be present in the modified pixel. Accordingly, light that would otherwise reflect from a reflecting layer of a pixel is instead allowed to impinge onto the photosensitive electronic device, which may be at or near the lower portion of the modified pixel, as described in detail below.

In a number of embodiments, a display device, such as an electrowetting display device, may be a transmissive, reflective or transflective display that generally includes an array of pixels (e.g., or subpixels) configured to be operated by an active matrix addressing scheme. For example, rows and columns of electrowetting elements are operated by controlling voltage levels on a plurality of data lines and gate lines. In this fashion, the display device may produce an image by selecting particular pixels to transmit, reflect or block light. Pixels may be addressed (e.g., selected) via rows and columns of the data lines and gate lines that are electrically connected to transistors (e.g., used as switches) included in each pixel. Transistors take up a relatively small fraction of the area of each pixel to allow light to efficiently pass through (or reflect from) the pixel. For example, the transistor may be located underneath the reflector in reflective displays. Herein, a pixel (e.g., pixel region) may, unless otherwise specified, comprise a single subpixel or a pixel that includes two or more subpixels of an electrowetting display device. Such a pixel or subpixel may be the smallest light transmissive, reflective or transflective element of a display that is individually operable to directly control an amount of light transmission through and/or reflection from (e.g., light throughput) the element. For example, in some implementations, a pixel may be a pixel that includes a red subpixel, a green subpixel, a blue subpixel, and a white pixel (e.g., as in a Pentile® layout). In other implementations, a pixel may be a pixel that is a smallest component, e.g., the pixel does not include any subpixels.

In various embodiments, electrowetting displays include an array of pixels comprising pixels and/or subpixels sandwiched between two support plates, such as a substrate and a top plate. For example, the substrate may be a first support plate that, in cooperation with the top plate (the second support plate), contains pixels that include oil, electrolyte solution, and pixel walls between the support plates. Support plates may include glass, plastic (e.g., a transparent thermoplastic such as PMMA or other acrylic), metal, semiconductor material, or other material and may be made of a rigid or flexible material, for example.

Pixels include various layers of materials built upon a first support plate. One such layer may be a hydrophobic layer comprising, for example, a fluoropolymer (e.g., Teflon® AF1600®).

Hereinafter, example embodiments describe reflective electrowetting displays comprising an array of pixels sandwiched between a first support plate and a second support plate. The first support plate may be opaque while the second support plate may be transparent. Herein, describing an element or material as being "transparent" means that the element or material may transmit a relatively large fraction of the light incident upon it. For example, a transparent substrate or layer may transmit more than 70% or 80% of the light impinging on its surface, though claimed subject matter is not limited in this respect.

The transparent second support plate may comprise glass or any of a number of transparent materials, such as plastic, quartz, semiconductors, and so on, though claimed subject matter is not limited in this respect. Also, as used herein for sake of convenience of describing example embodiments, the second support plate is that through which viewing of pixels of a (reflective) electrowetting display occurs.

Pixel walls retain at least a first fluid within respective pixels. The first fluid may be electrically non-conductive and/or non-polar, such as opaque or colored oil, in the individual pixels. A cavity formed between the support plates is filled with the first fluid (e.g., the first fluid being retained within respective pixels by pixel walls) and a second fluid (e.g., an electrolyte solution) that is polar and may or may not be electrically conductive. The second fluid may be a water solution, such as a mixture of water and ethyl alcohol, or a salt solution, such as a solution of potassium chloride in water, for example. The second fluid may be transparent, but may be colored, or light-absorbing. The second fluid is at least partially immiscible with the first fluid.

In some embodiments, individual reflective electrowetting pixels may include a reflective layer on the first support plate of the electrowetting pixel, a transparent electrode layer adjacent to the reflective layer, and a hydrophobic layer on the electrode layer. Pixel walls of each pixel, the hydrophobic layer, and the transparent second support plate at least partially enclose a liquid region that includes an electrolyte solution and a light-absorbing or opaque liquid, which is immiscible with the electrolyte solution. An "opaque" liquid, as described herein, is used to describe a liquid that appears black or colored to an observer. For example, a black opaque liquid strongly absorbs a broad spectrum of wavelengths (e.g., including those of red, green and blue) in the visible region of electromagnetic radiation. In some implementations, the opaque liquid is a nonpolar oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

A spacer grid and edge seals which mechanically connect a first support plate with a second overlying support plate, or which form a separation between the first support plate and the second support plate, contribute to the mechanical integrity of the electrowetting display. Edge seals, for example, being disposed along a periphery of an array of electrowetting display device pixels, may contribute to retaining (e.g., first and second) fluids between the first support plate and the second overlying support plate.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

FIG. 1 is a cross-section of a portion of a reflective electrowetting display device illustrating several electrowetting pixels 100, according to some embodiments. Though three such electrowetting pixels are illustrated, an electrowetting display device may include any number (usually a very large number, such as thousands or millions) of electrowetting pixels. An electrode layer 102 is formed on a first support plate 104 and may comprise one or more individual electrodes in each electrowetting pixel.

In various embodiments, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over a supporting (but non-conducting) substrate, which may be glass or any of a number of other transparent or non-transparent materials, for example.

In some implementations, a barrier layer 106 may at least partially separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel walls 110 form a patterned electrowetting pixel grid on hydrophobic layer 108. Pixel walls 110 may comprise a photoresist material such as, for example, epoxy-based negative photoresist SU-8. The patterned electrowetting pixel grid comprises rows and columns that form an array of electrowetting pixels. For example, an electrowetting pixel may have a width and length in a range of about 50 to 500 microns. In some implementations, the pixel walls need not be on the hydrophobic layer. For example, pixel walls may be directly on the electrode layer (not illustrated in FIG. 1).

A first fluid 112, which may have a thickness (e.g., depth) in a range of about 1 to 10 microns, for example, overlies hydrophobic layer 108. First fluid 112 is partitioned by pixel walls 110 of the patterned electrowetting pixel grid. An perimeter region 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is non-polar and may for instance be an alkane like hexadecane or (silicone) oil.

A second support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 extend from tops 124 of pixel walls 110 to second support plate 118. In some implementations, spacer grid 122 need not be in contact with tops 124 of pixel walls 110, and there may be a gap between spacer grid 122 and tops 124. Such a gap, for example, allows second fluid 116 to flow among different pixels 100.

The reflective electrowetting display device has a viewing side 128 on which an image formed by the electrowetting display device may be viewed, and a rear side 130. Second support plate 118 faces viewing side 128 and first support plate 104 faces rear side 130. Also, in a perspective where "top" is the upper portion of FIG. 1 and "bottom" is the lower portion of FIG. 1, a top surface of support plate 104 faces viewing side 128. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region.

In some embodiments, electrowetting pixels may include a top electrode 140 disposed on second support plate 118, one or more color filters (not illustrated), or a black matric (not illustrated). The electrode on the second support plate may or may not be patterned to form any of a number of circuit configurations, for example.

In some embodiments, a photosensitive electronic device 142 (e.g., any kind of sensor that can detect and/or measure intensity of light) may be located at or below electrode layer 102. For example, in one implementation, photosensitive electronic device 142 may be disposed substantially in the plane of electrode layer 102. In such a case, material of electrode layer 102 may be missing from the location of photosensitive electronic device 142. In another implementation (not illustrated), photosensitive electronic device 142 may be disposed substantially below electrode layer 102, such as in first support plate 104. So that light may reach photosensitive electronic device 142, a portion of electrode layer 102 that is above photosensitive electronic device 142 may be missing.

In the embodiment illustrated in FIG. 1, the pixel that includes photosensitive electronic device 142, hereinafter called a photo-sensor pixel, is immediately to the left of pixel 100 that is indicated by the dashed rectangle. The photo-sensor pixel need not be a functioning pixel in terms of displaying content by reflecting or transmitting a pixel of the content. As described below, photo-sensor pixel may comprise a border pixel, for example.

Photosensitive electronic device 142 may be electronically connected to a controller (not illustrated in FIG. 1). Accordingly, the controller may receive voltage generated by photosensitive electronic device 142 in response to photosensitive electronic device 142 receiving light that transmits through second support plate 118, top electrode 140, second fluid 116, first fluid 112, hydrophobic layer 108, and barrier layer 106 (if present), for example.

Hydrophobic layer 108 is arranged on first support plate 104 to create an electrowetting surface area. The hydrophobic character causes first fluid 112 to adhere preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability of more than 90° to complete wettability at 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or reflective. A reflective layer may reflect the entire visible spectrum, making the layer appear white, or part of it, making it have a color.

If a voltage is applied across electrowetting pixel 100 (e.g., between electrode layer 102 and top electrode 140), electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
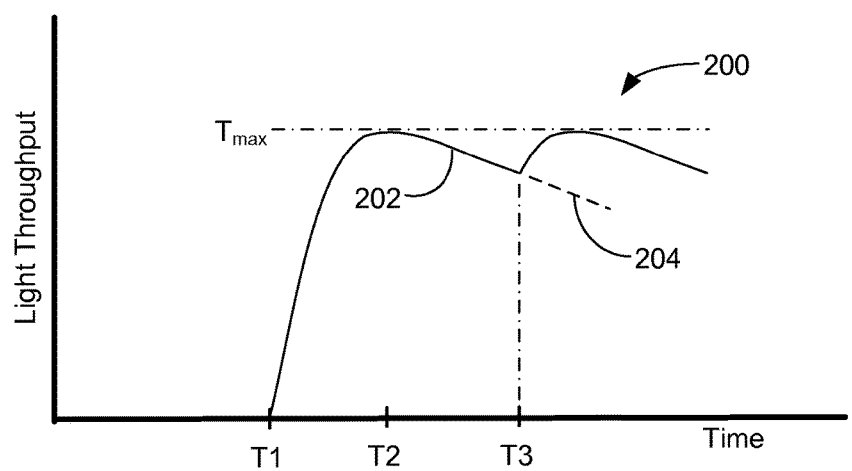
FIG. 2 is a plot of light throughput of an electrowetting pixel as a function of time, according to various embodiments.

FIG. 2 is a plot 200 of light throughput of electrowetting element 100 as a function of time, according to various embodiments. Though transmission is discussed, electrowetting pixel 100 may be incorporated in a transmissive or reflective type of electrowetting display. Here, transmission refers to the amount of light that arrives at hydrophobic layer 108, wherein the light may subsequently be reflected from a layer underlying hydrophobic layer 108 or may be transmitted through the underlying layers and first support plate 104, for example.

Figure 3:
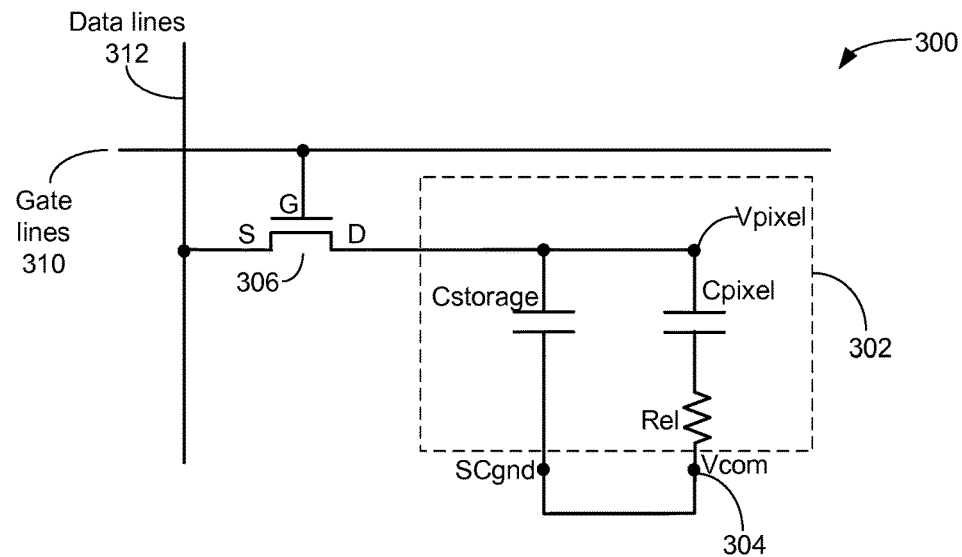
FIG. 3 is a schematic circuit diagram of a circuit of an electrowetting pixel, according to various embodiments.

Plot 200 demonstrates how backflow of first fluid 112 can affect light transmission through electrowetting pixel 100. In a first display period, before time T1, a voltage V applied between electrode layer 102 and top electrode 140 is zero, electrowetting pixel 100 is in an inactive state, and the light transmission is zero. At time T1, a voltage V applied between electrode layer 102 and top electrode 140 is set at a non-zero active signal level so that electrowetting pixel 100 will enter into an active state. For example, voltage V may be the voltage of the drain of a TFT 306, as illustrated in FIG. 3. Electrostatic forces move second fluid 116 toward electrode layer 102 and first fluid 112 is consequently displaced from the area of hydrophobic layer 108 to pixel walls 110 surrounding the area of hydrophobic layer 108, to a droplet-like form. Thus, first fluid 112 uncovers the surface of hydrophobic layer 108 and light transmission rapidly increases to a transmission level $T_{max}$ at time T2.

During or after the application of voltage V, first fluid 112 will gradually flow back to increasingly cover hydrophobic layer 108, thereby reducing light transmission of electrowetting pixel 100. The decrease in light transmission due to backflow is indicated by the down-slope portion 202 in plot 200. Portion 202, and thus light transmission, continues to decrease over time. At time T3, a reset pulse (not illustrated in FIG. 2) is applied to counteract the effects of backflow. The reset pulse momentarily suspends backflow and induces first fluid motion over the pixel area. After the reset pulse, the data voltage for a corresponding grey level can be applied to the pixel for the duration of the display period. Reset pulses are sufficiently short so as not to produce flicker for an observer of the image of the electrowetting display. Subsequently, light transmission may increase back to $T_{max}$.

In contrast, without the reset pulse the transmission of the element would have followed the slanting dashed line 204 in plot 200. With a reset pulse, however, the transmission of the element will return to $T_{max}$. Although effects of a reset pulse are explained with reference to an electrowetting element operating in transmission, a similar explanation can be given for an electrowetting element operating in reflection, whereby the display state of the element is not represented by transmission but by reflection.

In some particular embodiments, the duration of a reset pulse may be in a range from about 0.5 milliseconds up to about 2.0 milliseconds, and the duration of a display period may be about 20 milliseconds. A reset pulse can reduce effects of backflow to such an extent that an observer need not perceive these effects. As mentioned above, reset pulses are sufficiently short so as not to produce flicker for an observer of the image of the electrowetting display.

FIG. 3 is a schematic circuit diagram of a circuit 300 of an electrowetting pixel of a display device, according to various embodiments. Circuit 300 includes a pixel portion 302 that includes the optical portion of electrowetting element 300. Here, referring to the example embodiment illustrated in FIG. 1, for example, such an optical portion includes first and second fluids 112 and 116, and portions of electrode layer 102 and top electrode 140. An electrical representation of the optical portion is illustrated in pixel portion 302. For example, capacitance Cpixel represents a capacitance formed by a multiple dielectric layer stack between two electrodes (e.g., electrode layer 102 and top electrode 140) of pixel portion 302. Cstorage represents a storage capacitor included in pixel portion 302. Rel represents electrical resistance of second fluid 116 (e.g., electrolyte). Vpixel is the voltage of pixel portion 302 with respect to a common voltage "point", Vcom 304 (though a portion of the electrowetting element at the common voltage may be an extended region and need not be a point). For example, Vcom 304 may be the same as top electrode 140. In some implementations, Vpixel is also the voltage of the drain of TFT 306, which is used, among other things, to select electrowetting element 300 from an array of rows and columns of such electrowetting elements.

In some embodiments, pixel portion 302 is electrically connected to a reset controller (not illustrated), which may comprise electronic circuitry, code executable by a processor, or a combination thereof. For example, a top electrode, such as top electrode 140 illustrated in FIG. 1 may be electrically connected to the reset controller at Vcom. A bottom electrode (e.g., a portion of a TFT on a bottom support plate), such as a portion of electrode layer 102 illustrated in FIG. 1, includes storage capacitor Cstorage. A ground voltage point of Cstorage, SCgnd may be electrically connected to the reset controller. During a situation when no reset pulse is present, VCOM and SCgnd may be electrically connected to each other and may be at the same electrical potential. On the other hand, if the reset controller is activated to generate a reset pulse, the electrical connection between VCOM and SCgnd is broken and the reset pulse may be applied across VCOM and SCgnd.

The display device includes rows of gate lines 310 for selecting particular electrowetting elements and columns of data lines 312 for electrically driving the selected electrowetting elements. Gate lines 310 and data lines 312 may comprise conductive traces on a support plate (e.g., first support plate 104). Gate line 310 is electrically connected to the gate of data TFT 306 to select or deselect electrowetting element 300. Data line 312 is electrically connected to the source of data TFT 306. The drain of TFT 306 is electrically connected to pixel portion 302. In other implementations, different types of TFTs (e.g., n-type or p-type) may be used so that sources and drains may be reversed in the example descriptions herein. Claimed subject matter is not limited in this respect. Also, embodiments are described herein as having rows and columns of conductive lines (e.g., 310 and 312). However, the descriptions may include a switch between "rows" and "columns" without affecting the nature of such descriptions. Claimed subject matter is not limited in this respect.

Figure 4:
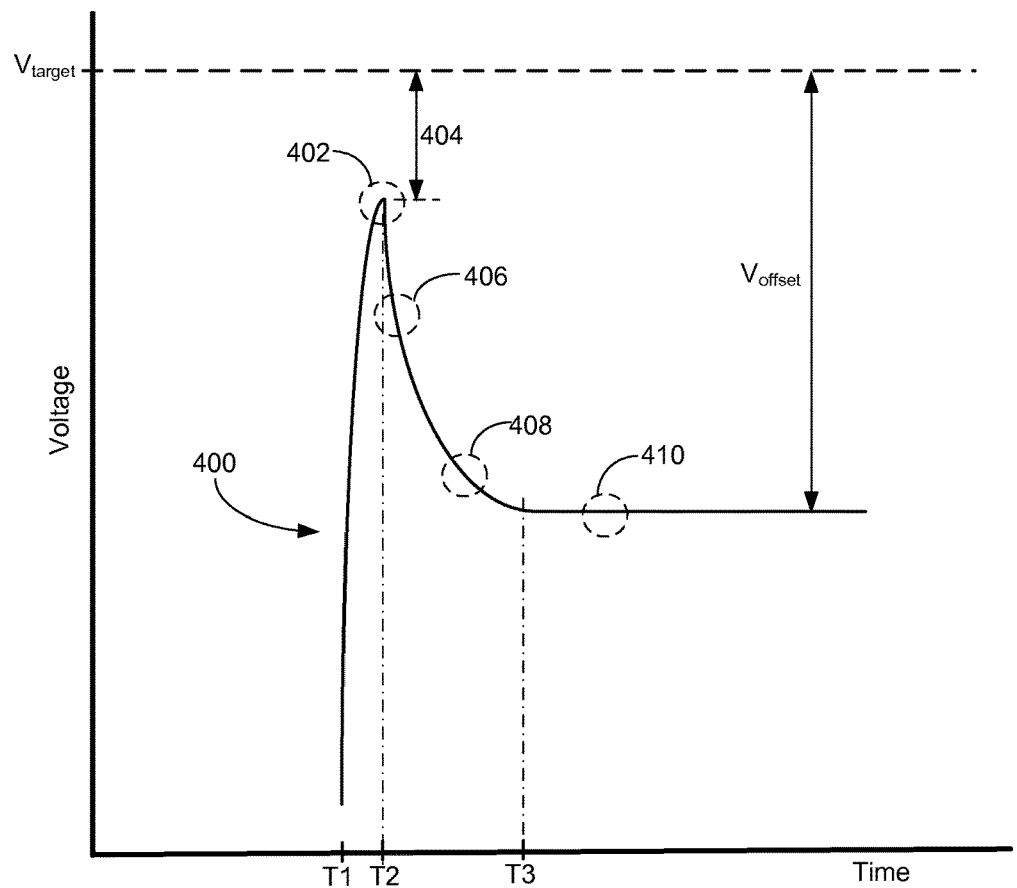
FIG. 4 is a plot of a portion of a reset voltage pulse as a function of time for an electrowetting pixel, according to various embodiments.

FIG. 4 is a plot of a portion of a reset pulse 400 as a function of time for an electrowetting pixel, according to various embodiments. For example, reset pulse 400 may be applied to pixel portion 302 by the reset controller, referring to FIG. 3. Reset pulse is, for example, a square pulse having a target amplitude of $V_{target}$ and a pulse width of about 1 millisecond. In such a case, a time span between T1 and T3 may be a small fraction of the pulse width, such as 10 microseconds, for example. The time span from T1 to T3 includes a transient response to the application of reset pulse 400. In the example illustrated, reset pulse 400 begins to be applied at time T1 and includes a rising edge to time T2. Subsequently, reset pulse decays (e.g., corresponding at least approximately to an RC (resistance-capacitance) time constant) from time T2 to time T3.

Various portions of reset pulse 400 are identified. Undercharge (e.g., word line and RC) effect tends to contribute to the voltage at portion 402. For example, intrinsic capacitances and resistances (e.g., Cpixel and Rel) in pixel portion 302 are associated with an RC time constant that affects the response of the pixel portion to applied reset pulse 400. One such effect is that reset pulse 400, with a target amplitude voltage, falls short of $V_{target}$ by a voltage difference 404.

Voltage kickback (e.g., based, at least in part, on intrinsic capacitances in pixel portion 302) effect tends to contribute to the voltage at portion 406. Rel effect tends to contribute to the voltage at portion 408. Pixel capacitance and TFT leakage (e.g., TFT 306) tends to contribute to the voltage at portion 410. For example, TFT 306 may experience drain-gate (D-G) and source-gate (S-G) current leakages.

As a result of such effects, the steady-state amplitude of reset pulse 400 may be less than $V_{target}$ by a voltage $V_{offset}$. For a numerical example, $V_{target}$ may be about 10 volts and $V_{offset}$ may be about 3.6 volts, though claimed subject matter is not limited in this respect.

Figure 5:
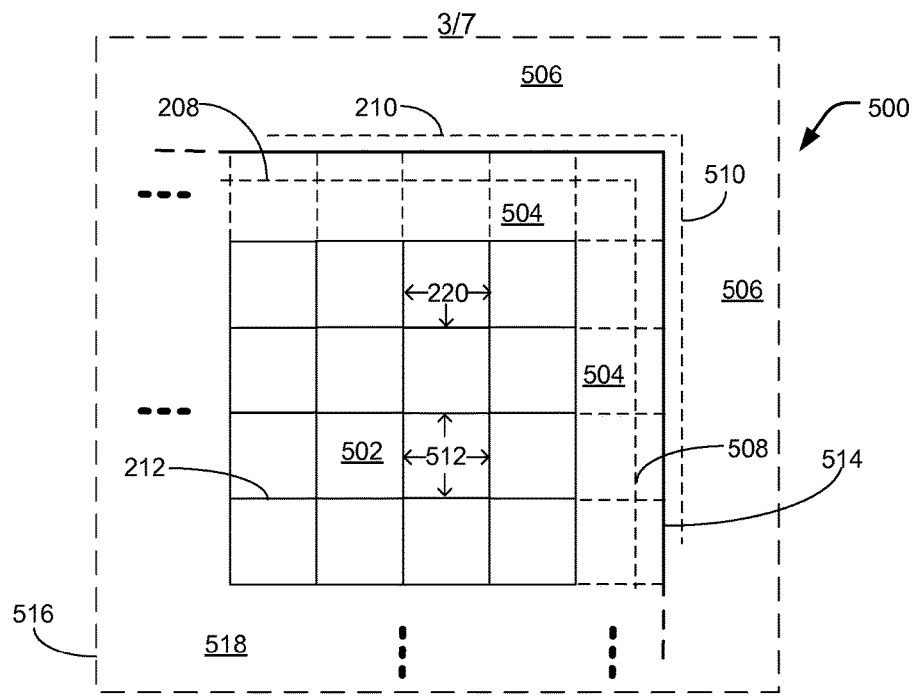
FIG. 5 is a top view illustrating a portion of an electrowetting pixel array of an electrowetting display device, according to various embodiments.

FIG. 5 is a top view of a portion 500 of an electrowetting display, according to some embodiments. For example, portions of the electrowetting display may be the same as or similar to that illustrated in FIG. 1. Portion 500 includes a number of field pixels 502 and border pixels 504. These pixels are surrounded by a perimeter region 506. In some implementations, a seal material 508 is located in a region of border pixels 504. Such a seal material may comprise any of a number of polymers and/or adhesives, for example. In alternate implementations, a seal material 510 is located in a portion of perimeter region 506. Pixel walls 512 surround individual field pixels 502. In some implementations, pixel walls 512 extend from field pixels 502 to an edge 514 of perimeter region 506. An underlying bottom support plate 516 is covered with a fluoropolymer layer 518. An overlying top support plate (not illustrated in FIG. 5) may be mechanically connected to pixel walls 512 by spacers (not illustrated in FIG. 5) that extend from the top support plate to at least portions of tops of pixel walls 512.

In some implementations, border pixels 504 are not functional pixels. In other words, border pixels 504 need not be capable of operating as a display pixel. Accordingly, border pixels 504 need not include oil or an overlying electrolyte (border pixels 504 can nevertheless be filled with oil and electrolyte from the same part of the fabrication process that also fills field pixels 502).

Figure 6:
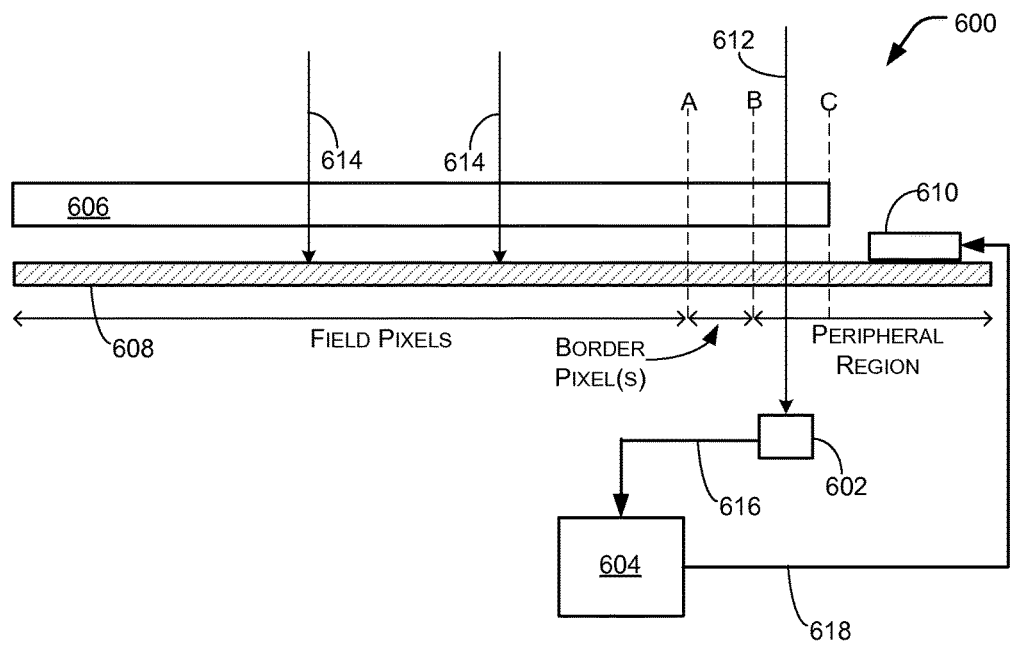
FIG. 6 is a block diagram of electrowetting display device including a photo-sensor and controller, according to various embodiments.

FIG. 6 is a block diagram of electrowetting display device 600 including a photo-sensor 602 (or merely "sensor") and controller 604, according to various embodiments. Electrowetting display device 600 may be the same as or similar to that illustrated in FIG. 1, though for sake of clarity a number of elements are not included in FIG. 6. Photo-sensor 602 may comprise a photodiode, a charge-coupled device, a photovoltaic cell, or any of a number of types of devices that can generate an electrical current or voltage in response to receiving light energy (e.g., energy of electromagnetic flux).

Electrowetting display device 600 includes a cover plate 606 and a TFT layer 608. Cover plate 606 may be the same as or similar to second support plate 118 (FIG. 1) and may comprise a color filter in some implementations. TFT layer 608 may comprise an array of TFT's respectively associated with an array of pixels, such as pixels 502 (FIG. 5). For example, TFT layer 608 may be the same as or similar to electrode layer 102, illustrated in FIG. 1. As labelled in FIG. 6, a portion of TFT layer 608 includes field pixels, such as field pixels 502, and border pixels, such as border pixels 504. A portion of TFT layer 608 also includes a peripheral region.

In some embodiments, such a peripheral region may include electronic circuitry that is used to individually manipulate the individual field pixels. Accordingly, a plurality of electrical conductors (e.g., rows and columns of source lines and gate lines) extend between the field pixels and the peripheral region. The peripheral region may also include electronic drive circuitry 610 to apply a reset pulse to the field pixels. The control circuit may adjust the amplitude of the reset pulse to modify voltage driving characteristics of the pixels. Such adjusting may be based, at least in part, on an electronic signal (e.g., voltage level) generated by photo-sensor 602. For example, photo-sensor 602 may produce a voltage corresponding to the intensity of light it receives. In some implementations, the amplitude of the reset pulse may affect the hydrophobicity of a hydrophobic layer (e.g., 108 illustrated in FIG. 1) of the field pixels. Accordingly, the voltage level generated by the photo-sensor may be based, at least in part, on the reset pulse-influenced hydrophobicity of the hydrophobic layer of the field pixels. Also, the voltage level generated by the photo-sensor may be based, at least in part, on the amount of surface on which a liquid, such as oil, covers the hydrophobic layer of the field pixels. In some implementations, an area of contact between an electrolyte solution and an electrode layer, such as 102, may be based, at least in part, on the voltage level generated by the photo-sensor.

In various embodiments, photo-sensor 602 may be located in electrowetting display device 600 so that the intensity of light 612 received by photo-sensor 602 is the same as or similar to light throughput of light 614 into the field pixels (e.g., whether the pixels are reflective or transmissive). In some implementations, photo-sensor 602 may be located in or below one or more border pixels. In such a case, the border pixel(s) may not include a reflective layer that is present in the field pixels. Accordingly, light 612 that would otherwise reflect from a reflecting layer of the border pixel is instead allowed to impinge onto photo-sensor 602.

In some implementations, photo-sensor 602 may be placed in a "modified" pixel, where such a pixel is similar to other pixels in an array of pixels (e.g., field pixels) except that a reflective layer may not be present in the modified pixel. For example, during a process of fabricating the structure on a first support plate (e.g., 104 in FIG. 1) of electrowetting display device 600, deposition of a reflective layer (e.g., electrode layer 102) may involve masking an area of one or more pixel regions so that the reflective layer is not deposited in those (modified) pixels.

As explained above, a number of inherent electronic properties of the pixels adversely affect reset pulses applied to the field pixels. For example, such adverse effects may include a drop in voltage of applied reset pulses. As a result, the field pixels may not be "optimally" operated and light throughput in the field pixels may be less than desired. By adjusting the amplitude of reset pulses based on light throughput of light 614 in the field pixels, controller 604 may compensate for such adverse effects.

Voltage generated by photo-sensor 602 may be provided to controller 604 via electronic conductor 616. Electronic signals generated by controller 604 may be provided to electronic drive circuitry 610 via electronic conductor 618. In some implementations, electronic conductors 616 and 618 may comprise conductive traces on a substrate (e.g., first support plate 104). In some implementations, controller 604 may be located on the peripheral region of TFT layer 608.

Controller 604 may be a processor, a CPU, or an ASIC, just to name a few examples. Functions of controller 604 may be implemented by software, hardware, or both. Controller 604 may affect optical transmission or reflection of the field pixels by increasing or decreasing voltage on TFTs of the respective field pixels and by generating reset pulses, for example. In particular, individual field pixels are electrically connected to (i) one of data lines to provide a source signal to the TFT (e.g., TFT 306), (ii) one of gate lines to provide a gate signal to the TFT, and (iii) one of reset voltage lines to provide a reset voltage to the individual filed pixels.

Figure 7:
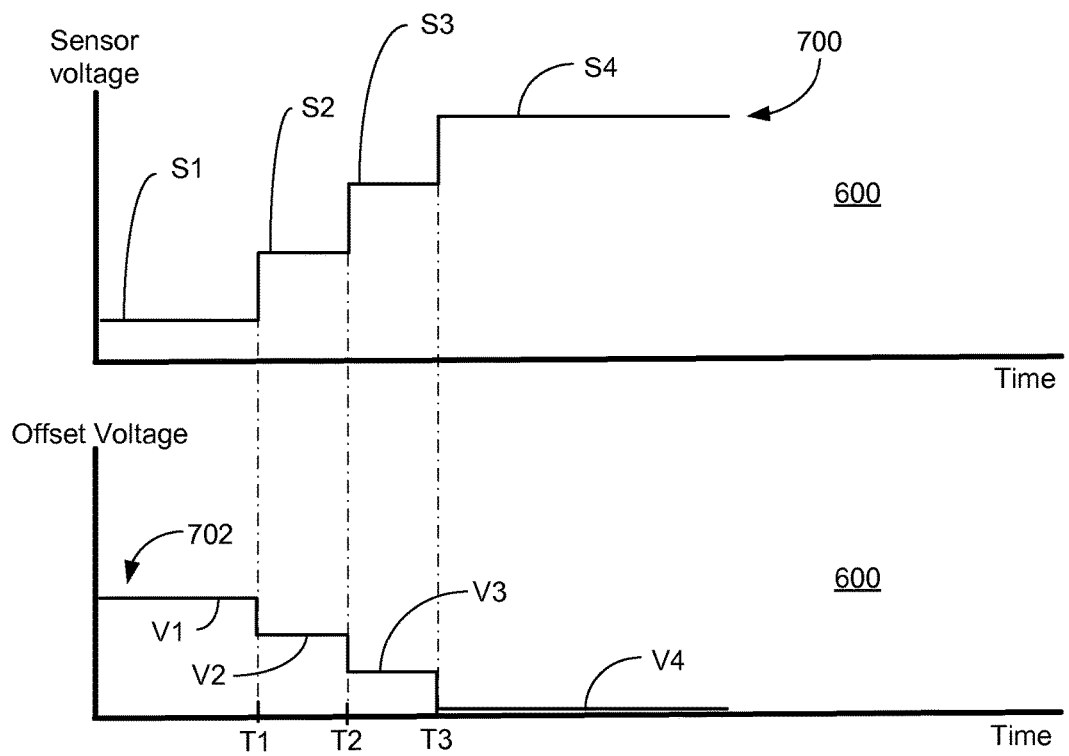
FIG. 7 includes plots of a photo-sensor voltage and an offset voltage associated with driving a pixel of an electrowetting display device as a function of time, according to various embodiments.

FIG. 7 includes plots of a photo-sensor voltage 700 and an offset voltage 702 associated with driving a pixel of an electrowetting display device as a function of time, according to various embodiments. For example, photo-sensor voltage 700 may be generated by photo-sensor 602, illustrated in FIG. 6. Offset voltage 702 may be a voltage difference between a target voltage and an actual voltage for a reset pulse. For example, as a result of effects such as undercharge, voltage kickback effect, Rel effect, and pixel capacitance and TFT leakage, the steady-state amplitude of a reset pulse may be less than a target voltage by a difference voltage (e.g., $V_{diff}$ illustrated in FIG. 4).

Describing a particular example of operation of a pixel, up to time T1, the sensor voltage is relatively low, at a first level S1. In this time period, the relatively low first level corresponds to a relatively large offset voltage V1. Here, the relatively large offset voltage of the reset pulse results in a less than optimal driving conditions and a smaller white area (e.g., corresponding to light throughput) of the pixel, as compared to ideal driving conditions.

At time T1, a controller (e.g., 604) responding to a relatively low light intensity incrementally adds voltage to reset pulses applied to the pixel. Accordingly, at time T1, the offset voltage is decreased to second level V2. This results in increased white area and brightness for the pixel. In response, the photo-sensor receives increased light intensity and the voltage generated by the photo-sensor increases to second level S2.

At time T2, the controller responding to a relatively low light intensity further adds voltage to reset pulses applied to the pixel. Accordingly, at time T2, the offset voltage is decreased to third level V3. This results in increased white area and brightness for the pixel. In response, the photo-sensor receives increased light intensity and the voltage generated by the photo-sensor increases to third level S3.

At time T3, the controller responding to a relatively low light intensity further adds voltage to reset pulses applied to the pixel. Accordingly, at time T3, the offset voltage is decreased to fourth level V4, which may be substantially zero. In other words, the controller has added an amount of voltage to the reset pulses to compensate for the offset voltage due to the inherent effects that cause, at least in part, the voltage offset. This results in increased white area and substantially optimal brightness for the pixel (for the desired grey level). In response, the photo-sensor receives increased light intensity and the voltage generated by the photo-sensor increases to fourth level S4.

Figure 8:
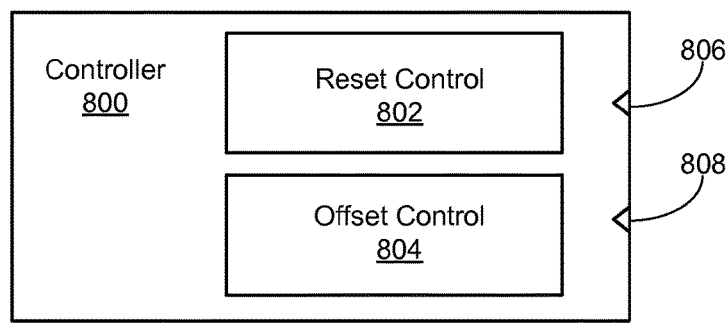
FIG. 8 is a block diagram of a controller for an electrowetting display device, according to various embodiments.

FIG. 8 is a block diagram of a controller 800 for an electrowetting display device, according to various embodiments. For example, controller 800 may be the same as or similar to controller 604 illustrated in FIG. 6. Controller 800 includes, among other things, a reset control block 802 and an offset control block 804. Though illustrated as two separate blocks, reset control block 802 and offset control block 804 may be separate or single electrical circuits or multiple circuits in a single package, code executable by one or more processors, or any combination thereof. For example, reset control block 802 may comprise logic circuitry and/or a processor for executing code.

Reset control block 802 may be in electrical contact with a second electrode (e.g., second electrode 140, illustrated in FIG. 1) of the electrowetting display device. In some implementations, reset control block 802 may electrically connect to the second electrode via an output port 806, from where reset pulses may be provided to the electrowetting display device from controller 800. For example, such a second electrode may be the same as or similar to Vcom 304 (FIG. 3). Via the second electrode, reset control block 802 may provide a reset pulse to pixels of the electrowetting display device, such as the field pixels illustrated in FIG. 6.

In some particular embodiments, a pixel of an electrowetting display device may be in an on-state if a voltage from a first electrode (e.g., electrode layer 102, illustrated in FIG. 1) to the second electrode of the electrowetting pixel is a negative value. On the other hand, the electrowetting pixel may be in an off-state if the voltage from the first electrode to the second electrode of the electrowetting pixel is zero. For an example of negative voltage driving, such as in embodiments described above, the negative value of the on-state may be approximately −25 volts for a particular grey scale value and the off-state may be approximately zero volts. Of course, such voltage values are merely examples, and claimed subject matter is not so limited.

The reset pulse may at least momentarily set the voltage from the first electrode to the second electrode of the electrowetting pixels to zero (or a particular positive value for AC driving), regardless of the state of the electrowetting pixels. In some implementations, the reset pulse may be a square pulse, a sawtooth pulse, or a triangular pulse, just to name a few examples.

Offset control block 804 may be in electrical contact with gate lines and data lines of the electrowetting display device. Gate lines and data lines electrically connect to individual pixels of the electrowetting display device. In some implementations, display control block 804 may electrically connect to the gate lines and the data lines via an output port 808, from where control signals may be provided to the electrowetting display device from controller 800.

Figure 9:
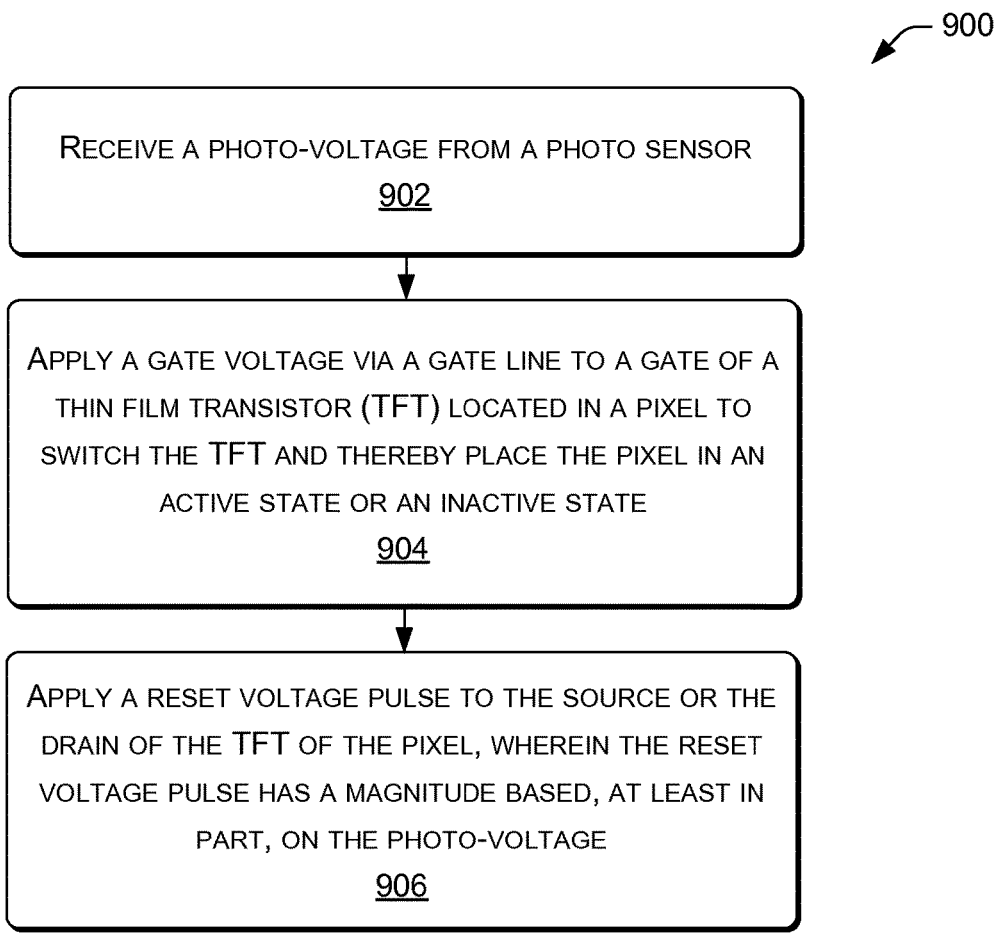
FIG. 9 is a flow diagram of a process for operating an electrowetting display device, according to various example embodiments.

FIG. 9 is a flow diagram of a process 900 for operating an electrowetting display device, according to various example embodiments. For example, such an electrowetting display device may include electrowetting elements such as 100 or 302 illustrated in FIGS. 1 and 3, respectively. Process 900 may be performed by controller 800 or one or more processors (e.g., processor(s) 1210, illustrated in FIG. 12), for example. Process 900 is described as being performed by controller 800.

At block 902, controller 900 receives a photo-voltage (e.g., voltage based, at least in part, on light) from a photo-sensor, such as photo-sensor 602 illustrated in FIG. 6. At block 904, the controller may apply a gate voltage via a gate line to a gate of a TFT located in a pixel to switch the TFT and thereby place the pixel in an active state or an inactive state. At block 906, the controller may apply a reset pulse to the source or the drain of the TFT of the pixel. The reset pulse may have a magnitude based, at least in part, on the photo-voltage. In some implementations, the controller may iteratively change the magnitude of the reset pulse, measure the magnitude of the photo-voltage and, upon or after measuring a threshold value of the photo-voltage, maintain the magnitude of the reset pulse at a substantially constant value.

Figure 10:
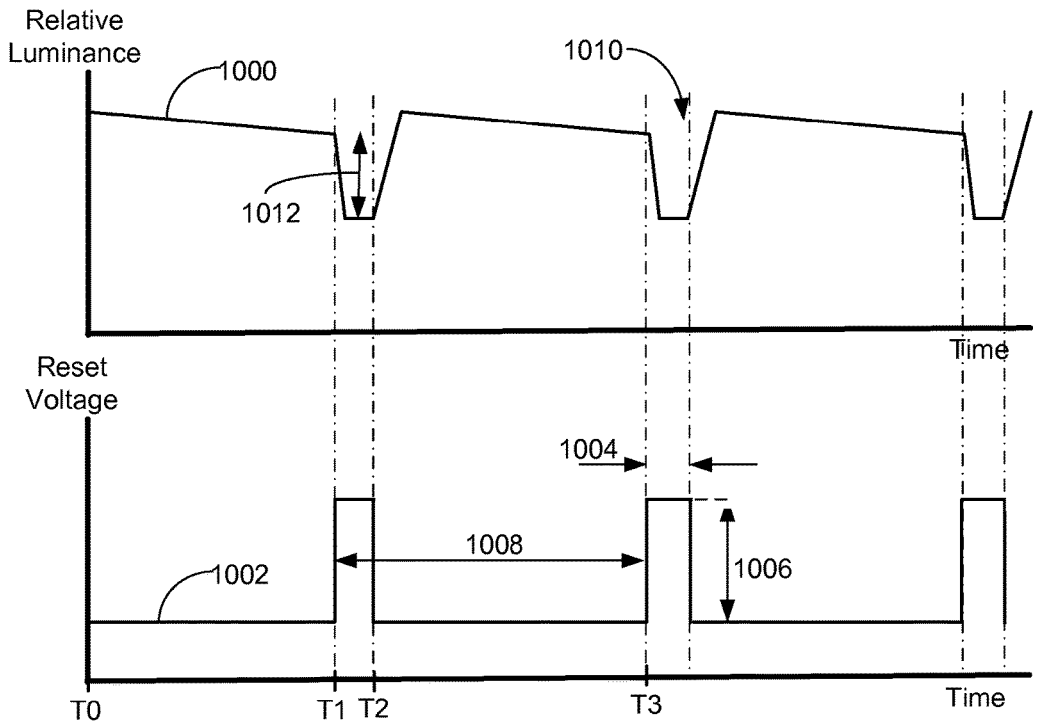
FIG. 10 includes plots of relative luminance and reset voltage associated with operating a pixel of an electrowetting display device as a function of time, according to various embodiments.

FIG. 10 includes a plot of relative luminance 1000 and reset voltage 1002 associated with operating a pixel of an electrowetting display device as a function of time, according to various embodiments. For example, relative luminance 1000 may represent the light throughput (e.g., brightness) of the pixel. Reset pulses may have a substantially square shape described by pulse width 1004, pulse amplitude 1006, and pulse frequency 1008 (e.g., corresponding to pulse period). In other embodiments, reset pulses may have shapes other than square, such as for example triangular and sawtooth, just to name a few examples.

Voltage generated by a photo-sensor may follow the relative luminance. For example, as the luminance of a pixel changes, so does the light from the pixel to the photo-sensor. Accordingly, the changing light results in a changing voltage generated by the photo-sensor.

From time T0 to time T1, the relative luminance of a pixel gradually decreases due to backflow in the pixel. To at least partially compensate for such backflow, a reset pulse is applied between times T1 and T2. During this period, the relative luminance substantially decreases before increasing back to the initial value (e.g., at time T0). The cycle repeats when, at time T3, another reset pulse is applied to the pixel. A transient luminance drop 1010 of luminance that occurs during each reset pulse tends to produce flicker, which is a modulation of brightness or intensity of light throughput of the pixel. Modulation of brightness may be associated with depth 1012 of transient luminance drop 1010. To an observer of the pixel, such flicker may be undesirable and a goal of some embodiments is to reduce, if not eliminate, the flicker. As described below, reducing flicker may be achieved by adjusting the shape of the reset pulses.

Figure 11:
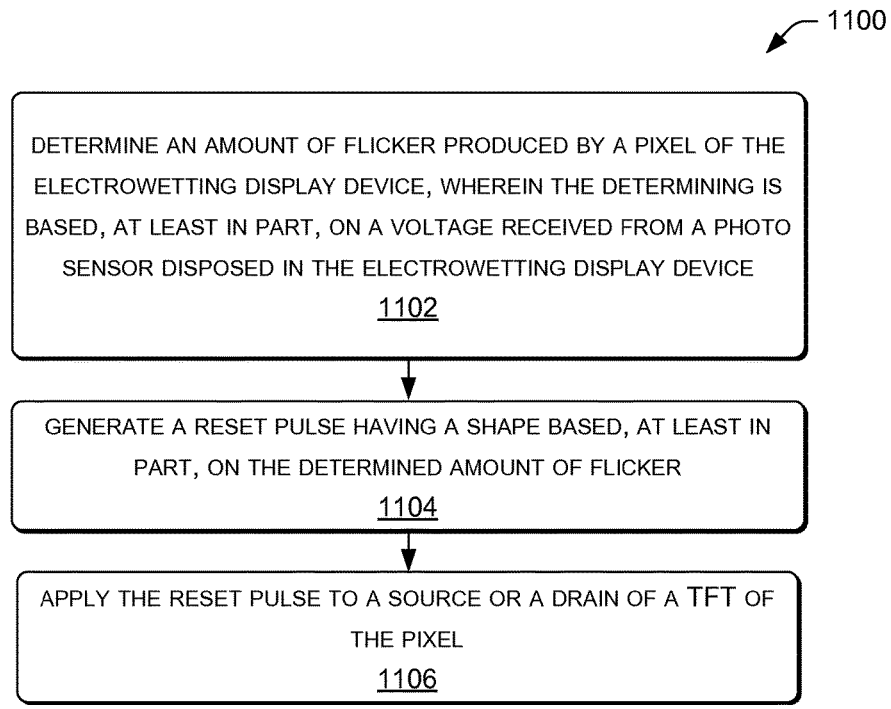
FIG. 11 is a flow diagram of a process for controlling the amount of flicker while operating an electrowetting display device, according to various example embodiments.

FIG. 11 is a flow diagram of a process 1100 for controlling the amount of flicker while operating an electrowetting display device, according to various example embodiments. For example, such an electrowetting display device may include pixels such as 100 or 302 illustrated in FIGS. 1 and 3, respectively. Process 1100 may be performed by controller 604 or one or more processors (e.g., processor(s) 1210, illustrated in FIG. 12), for example. Process 1100 is described as being performed by controller 604.

At block 1102, controller 604 may determine an amount of flicker produced by a pixel of the electrowetting display device. Herein, unless described as otherwise, "a pixel" may refer to a plurality of pixels. Thus, for example, "flicker produced by a pixel" may mean "flicker produced by a plurality (e.g., two or more) of pixels". Determining the amount of flicker may be based, at least in part, on a voltage received from a photo-sensor disposed in the electrowetting display device (e.g., disposed in a modified pixel sans a reflector). For example, such a photo-sensor may be similar to or the same as photo-sensor 602 illustrated in FIG. 6. In some implementations, the amount of flicker may be determined and quantified based, at least in part, on a change in voltage (generated by the photo-sensor) corresponding to the depth 1012 of transient luminance drop 1010. In turn, depth 1012 may depend, at least in part, on reset pulse amplitude. Flicker may also depend, at least in part, on reset pulse frequency and reset pulse width. Digital and/or analog circuitry may be used to quantify flicker, for example.

At block 1104, controller 604 may generate a reset pulse having a shape based, at least in part, on the measured amount of flicker. The shape of the reset pulse may be described by a number of parameters, such as pulse width, pulse frequency, and pulse amplitude. The controller may determine particular values of reset pulse parameters such as width, pulse frequency, and/or pulse amplitude of the reset pulse based, at least in part, on the determined amount of flicker. In some embodiments, for example, the controller may adjust one such parameter of a reset pulse applied to a pixel while monitoring (e.g., continuously, periodically, or from time to time) the amount of flicker produced by the pixel. In this fashion, the controller may determine a particular value of the parameter that results in a relative minimum flicker. Subsequently, the controller may adjust another parameter of a reset pulse applied to the pixel while monitoring the amount of flicker produced by the pixel. In this fashion, the controller may determine a particular value of the other parameter that results in a relative minimum flicker. Thus, at this stage, the controller has determined a combination of the two reset pulse parameters that results in a minimum flicker. Continuing in this fashion, the controller may adjust yet another (e.g., third) parameter of a reset pulse applied to the pixel while monitoring the amount of flicker produced by the pixel. In this fashion, the controller may determine a particular value of this parameter that results in a relative minimum flicker. Thus, at this stage, the controller has determined a combination of three reset pulse parameters that results in a minimum flicker.

For a particular example, the controller may adjust the width of a reset pulse applied to a pixel while monitoring the amount of flicker produced by the pixel. In this fashion, the controller may determine a particular value of pulse width that results in a relative minimum flicker. Subsequently, the controller may adjust the amplitude of a reset pulse applied to the pixel while monitoring the amount of flicker produced by the pixel. In this fashion, the controller may determine a particular value of the pulse amplitude that results in a relative minimum flicker. Thus, at this stage, the controller has determined a combination of the pulse width and pulse amplitude that results in a minimum flicker. Continuing in this fashion, the controller may adjust the frequency of a reset pulse applied to the pixel while monitoring the amount of flicker produced by the pixel. In this fashion, the controller may determine a particular value of pulse frequency that results in a relative minimum flicker. Thus, at this stage, the controller has determined a combination of pulse width, pulse amplitude, and pulse frequency that results in a minimum flicker.

At block 1106, controller 604 may apply the reset pulse having a particular shape (e.g., described by pulse width, pulse amplitude, and/or pulse frequency) to a source or a drain of a TFT of the pixel. For example, the TFT may be the same as or similar to TFT 306 illustrated in FIG. 3.

Figure 12:
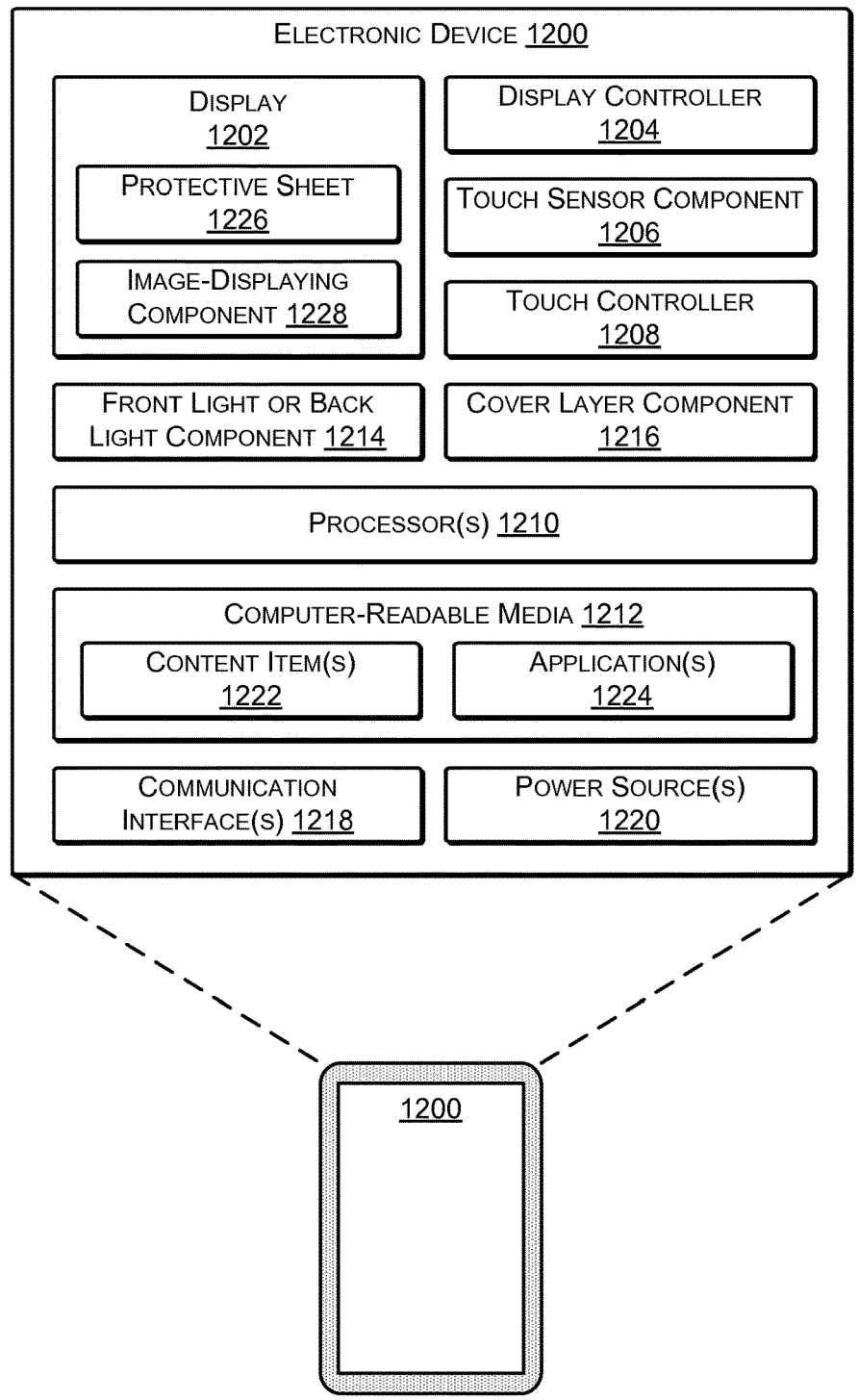
FIG. 12 illustrates an example electronic device that may incorporate a display device, according to some embodiments.

FIG. 12 illustrates an example electronic device 1200 that may incorporate any of the display devices discussed above. The device 1200 may comprise any type of electronic device having a display. For instance, the device 1200 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1200 may be a non-mobile electronic device (e.g., a computer display, a television, etc.). In addition, while FIG. 12 illustrates several example components of the electronic device 1200, it is to be appreciated that the device 1200 may also include other conventional components, such as an operating system, system busses, input/output components, and the like. Further, in other examples, such as in the case of a television or computer monitor, the electronic device 1200 may only include a subset of the components illustrated.

Regardless of the specific implementation of the electronic device 1200, the device 1200 includes a display 1202 and a corresponding display controller 1204. The display 1202 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even if very little or no power is supplied to the display. Some examples of the display 1202 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1200, the display 1202 may be an active display such as a fluid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1202 may represent a backlit display, examples of which are mentioned above.

In addition to including the display 1202, FIG. 12 illustrates that some examples of the device 1200 may include a touch sensor component 1206 and a touch controller 1208. In some instances, at least one touch sensor component 1206 resides with, or is stacked on, the display 1202 to form a touch-sensitive display (e.g., an electronic paper touch-sensitive display). Thus, the display 1202 may be capable of both accepting user touch input and rendering content in response to or corresponding to the touch input. As several examples, the touch sensor component 1206 may comprise a capacitive touch sensor, a force sensitive resistance (FSR), an interpolating force sensitive resistance (IFSR) sensor, or any other type of touch sensor. In some instances, the touch sensor component 1206 is capable of detecting touches as well as determining an amount of pressure or force of these touches.

FIG. 12 further illustrates that the electronic device 1200 may include one or more processors 1210 and one or more computer-readable media 1212, as well as a front light component 1214 (which may alternatively be a backlight component in the case of a backlit display) for lighting the display 1202, a cover layer component 1216, such as a cover glass or cover sheet, one or more communication interfaces 1218 and one or more power sources 1220. The communication interfaces 1218 may support both wired and wireless connection to various networks, such as cellular networks, radio, WiFi networks, short range networks (e.g., Bluetooth®), infrared (IR), and so forth.

Depending on the configuration of the electronic device 1200, the computer-readable media 1212 (and other computer-readable media described throughout) is an example of computer storage media and may include volatile and non-volatile memory. Thus, the computer-readable media 1212 may include, but is not limited to, RAM, ROM, EEPROM, flash memory, or other memory technology, or any other medium that may be used to store computer-readable instructions, programs, applications, media items, and/or data which may be accessed by the electronic device 1200.

The computer-readable media 1212 may be used to store any number of functional components that are executable on the processor 1210, as well as content items 1222 and applications 1224. Thus, the computer-readable media 1212 may include an operating system and a storage database to store one or more content items 1222, such as eBooks, audio books, songs, videos, still images, and the like. The computer-readable media 1212 of the electronic device 1200 may also store one or more content presentation applications to render content items on the device 1200. These content presentation applications may be implemented as various applications 1224 depending upon the content items 1222. For instance, the content presentation application may be an electronic book reader application for rending textual electronic books, an audio player for playing audio books or songs, a video player for playing video, and so forth.

In some instances, the electronic device 1200 may couple to a cover (not illustrated in FIG. 12) to protect the display (and other components in the display stack or display assembly) of the device 1200. In one example, the cover may include a back flap that covers a back portion of the device 1200 and a front flap that covers the display 1202 and the other components in the stack. The device 1200 and/or the cover may include a sensor (e.g., a Hall Effect sensor) to detect if the cover is open (i.e., if the front flap is not atop the display and other components). The sensor may send a signal to the front light component 1214 if the cover is open and, in response, the front light component 1214 may illuminate the display 1202. If the cover is closed, meanwhile, the front light component 1214 may receive a signal indicating that the cover has closed and, in response, the front light component 1214 may turn off.

Furthermore, the amount of light emitted by the front light component 1214 may vary. For instance, upon a user opening the cover, the light from the front light may gradually increase to its full illumination. In some instances, the device 1200 includes an ambient light sensor (not illustrated in FIG. 12) and the amount of illumination of the front light component 1214 may be based at least in part on the amount of ambient light detected by the ambient light sensor. For example, the front light component 1214 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1202 may vary depending on whether the front light component 1214 is on or off, or based on the amount of light provided by the front light component 1214. For instance, the electronic device 1200 may implement a larger default font or a greater contrast if the light is off compared to if the light is on. In some instances, the electronic device 1200 maintains, if the light is on, a contrast ratio for the display that is within a certain defined percentage of the contrast ratio if the light is off.

As described above, the touch sensor component 1206 may comprise a capacitive touch sensor that resides atop the display 1202. In some examples, the touch sensor component 1206 may be formed on or integrated with the cover layer component 1216. In other examples, the touch sensor component 1206 may be a separate component in the stack of the display assembly. The front light component 1214 may reside atop or below the touch sensor component 1206. In some instances, either the touch sensor component 1206 or the front light component 1214 is coupled to a top surface of a protective sheet 1226 of the display 1202. As one example, the front light component 1214 may include a lightguide sheet and a light source (not illustrated in FIG. 12). The lightguide sheet may comprise a substrate (e.g., a transparent thermoplastic such as PMMA or other acrylic), a layer of lacquer and multiple grating elements formed in the layer of lacquer that function to propagate light from the light source towards the display 1202, thus illuminating the display 1202.

The cover layer component 1216 may include a transparent substrate or sheet having an outer layer that functions to reduce at least one of glare or reflection of ambient light incident on the electronic device 1200. In some instances, the cover layer component 1216 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 1226 may include a similar UV-cured hard coating on the outer surface. The cover layer component 1216 may couple to another component or to the protective sheet 1226 of the display 1202. The cover layer component 1216 may, in some instances, also include a UV filter, a UV-absorbing dye, or the like, for protecting components lower in the stack from UV light incident on the electronic device 1200. In still other examples, the cover layer component 1216 may include a sheet of high-strength glass having an antiglare and/or antireflective coating.

The display 1202 includes the protective sheet 1226 overlying an image-displaying component 1228. For example, the display 1202 may be preassembled to have the protective sheet 1226 as an outer surface on the upper or image-viewing side of the display 1202. Accordingly, the protective sheet 1226 may be integral with and may overlie the image-displaying component 1228. The protective sheet 1226 may be optically transparent to enable a user to view, through the protective sheet 1226, an image presented on the image-displaying component 1228 of the display 1202.

In some examples, the protective sheet 1226 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 1226 may include a coating, such as the hard coating described above. For instance, the hard coating may be applied to the outer surface of the protective sheet 1226 before or after assembly of the protective sheet 1226 with the image-displaying component 1228 of the display 1202. In some examples, the hard coating may include a photoinitiator or other reactive species in its composition, such as for curing the hard coating on the protective sheet 1226. Furthermore, in some examples, the protective sheet 1226 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1226, thereby protecting the image-displaying component 1228 from UV light.

According to some implementations herein, one or more of the components discussed above may be coupled to the display 1202 using fluid optically-clear adhesive (LOCA). For example, suppose that the light guide portion of the front light component 1214 is to be coupled to the display 1202. The light guide may be coupled to the display 1202 by placing the LOCA on the outer or upper surface of the protective sheet 1226. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1214 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1214. In other implementations, the LOCA may be placed near a center of the protective sheet 1226, and pressed outwards towards a perimeter of the top surface of the protective sheet 1226 by placing the front light component 1214 on top of the LOCA. The LOCA may then be cured by directing UV light through the front light component 1214. As discussed above, and as discussed additionally below, various techniques, such as surface treatment of the protective sheet, may be used to prevent discoloration of the LOCA and/or the protective sheet 1226.

While FIG. 12 illustrates a few example components, the electronic device 1200 may have additional features or functionality. For example, the device 1200 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 1200 may reside remotely from the device 1200 in some implementations. In these implementations, the device 1200 may utilize the communication interfaces 1218 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
  a support plate;
  pixel regions each respectively comprising:
    a hydrophobic layer on the support plate;
    oil on the hydrophobic layer; and
    a thin film transistor (TFT),
  wherein a first one of the pixel regions comprises a sensor; and
  a reset control circuit configured to:
    receive a voltage from the sensor, wherein the voltage is generated, at least in part, on the basis of an amount of light impinging on the sensor, and the amount of light impinging on the sensor depends on a configuration of the oil of the first one of the pixel regions;
    determine an amount of modulation of the voltage;
    select a value for at least one of: a width, a frequency, or a magnitude of a reset pulse, based, at least in part, on the amount of modulation of the voltage; and
    apply the reset pulse to the TFT of a second one of the pixel regions.

2. The electrowetting display device of claim 1, wherein the sensor is located in a peripheral region of the support plate.

3. The electrowetting display device of claim 1, wherein the reset control circuit is configured to dynamically adjust at least one of the width, the frequency, or the magnitude of the reset pulse by:
  receiving the voltage from the sensor while applying additional reset pulses to the TFT of the second one of the pixel regions.

4. An electrowetting display device comprising:
  pixel regions on a support plate, wherein each of the pixel regions comprises a thin film transistor (TFT), respectively;
  a sensor on the support plate; and
  a reset control circuit configured to:
    based, at least in part, on a voltage generated by the sensor, determine an amount of modulation of light impinging on a first one of the pixel regions, wherein the voltage is generated, at least in part, on the basis of the amount of light impinging on the sensor, and the amount of light impinging on the sensor depends on a configuration of an oil of the first one of the pixel regions;
    generate a reset pulse based, at least in part, on the amount of modulation of the light; and
    apply the reset pulse to the TFT of a second one of the pixel regions.

5. The electrowetting display device of claim 4, wherein the control circuit is further configured to:
  iteratively change at least one of: an amplitude, a frequency, or a width of the reset pulse;
  receive measurements of a magnitude of the voltage; and
  upon or after receiving a substantially maximum value of the magnitude of the voltage, maintain the at least one of: the amplitude, the frequency, or the width of the reset pulse at a substantially constant value.

6. The electrowetting display device of claim 4, wherein the reset control circuit is further configured to dynamically adjust at least one of: a width, a frequency, or a magnitude of the reset pulse by:
  receiving the voltage from the sensor while applying additional reset pulses to the TFT of the second one of the pixel regions.

7. The electrowetting display device of claim 4, wherein the sensor is located in a peripheral region of the support plate.

8. The electrowetting display device of claim 4, wherein the pixel regions comprise field pixels and border pixels that at least partially surround the field pixels, and wherein at least one of the border pixels comprises the sensor.

9. The electrowetting display device of claim 8, wherein the border pixels comprise the first one of the pixel regions, and the first one of the pixel regions comprises the sensor.

10. The electrowetting display device of claim 4, further comprising an electrowetting fluid at least partially covering the support plate, wherein light that impinges on the support plate transmits through the electrowetting fluid before reaching the sensor.

11. The electrowetting display device of claim 4, wherein the first one of the pixel regions has a structure different from a structure of the second one of the pixel regions, and the first one of the pixel regions comprises the sensor.

12. A method for operating an electrowetting display device, the method comprising:
  receiving a voltage from a sensor of the electrowetting display device, wherein the voltage is generated, at least in part, on the basis of an amount of light impinging on the sensor, and the amount of light impinging on the sensor depends on a configuration of an oil of a first pixel of the electrowetting display device;

determining, based, at least in part, on the voltage received from the sensor, an amount of intensity modulation of the light;

generating a reset pulse based, at least in part, on the amount of the intensity modulation of the light; and applying the reset pulse to a source or a drain of a TFT of a second pixel of the electrowetting display device.

13. The method of claim 12, further comprising, dynamically changing a shape of the reset pulse in response to a change in the amount of the intensity modulation of the light.

14. The method of claim 12, wherein the sensor is located in the first pixel and the first pixel is a modified pixel having a structure different from a structure of the second pixel.

15. The method of claim 12, wherein the electrowetting display device comprises a field pixel at least partially surrounded by a periphery of border pixels, and wherein the sensor is located in at least one of the border pixels.

16. The method of claim 15, wherein the border pixels comprise the first pixel, and the first pixel comprises the sensor.

17. The method of claim 12, wherein the generating the reset pulse further comprises:

iteratively changing at least one of: an amplitude, a frequency, or a width of the reset pulse;

receiving measurements of a magnitude of the voltage; and upon or after receiving a substantially maximum value of the magnitude of the voltage, maintaining the at least one of: the amplitude, the frequency, or the width of the reset pulse at a substantially constant value.

18. The method of claim 12, wherein the generating the reset pulse comprises:

generating the reset pulse with a shape based, at least in part, on the amount of the intensity modulation of the light; and changing only one of a width, a frequency, or a magnitude of the reset pulse during the determining the amount of the intensity modulation of the light.

19. The method of claim 18, further comprising:

changing only another one of the width, the frequency, or the magnitude of the reset pulse during the determining the amount of the intensity modulation of the light.

20. The method of claim 12, further comprising changing a magnitude of the reset pulse in response to a change in a magnitude of the voltage.

* * * * *